United States Patent [19]

Bandyopadhyay et al.

[11] Patent Number: 5,541,470
[45] Date of Patent: Jul. 30, 1996

[54] METHOD FOR MAKING A TANTALA/SILICA INTERFERENCE FILTER ON A VITREOUS SUBSTRATE AND AN ELECTRIC LAMP MADE THEREBY

[75] Inventors: Gautam Bandyopadhyay, Acton; Keith A. Klinedinst, Marlboro; Silvia E. Lichtensteiger, Acton, all of Mass.

[73] Assignee: Osram Sylvania Inc., Danvers, Mass.

[21] Appl. No.: 348,686

[22] Filed: Dec. 2, 1994

[51] Int. Cl.$^6$ ................... H01J 5/16; H01K 1/50
[52] U.S. Cl. .............. 313/111; 313/112; 313/580
[58] Field of Search .................. 313/111, 111 X, 313/112, 489, 580, 635; 359/885, 581, 614

[56] References Cited

U.S. PATENT DOCUMENTS

| | | | |
|---|---|---|---|
| 4,379,981 | 4/1983 | Rusch | 313/489 |
| 4,663,557 | 5/1987 | Martin, Jr. et al. | 313/112 |
| 4,775,203 | 10/1988 | Vakil et al. | 350/1.7 |
| 4,780,334 | 10/1988 | Ackerman | 427/248 |
| 4,949,005 | 8/1990 | Parham et al. | 313/112 |
| 4,983,001 | 1/1991 | Hagiuda | 313/112 |
| 5,196,759 | 3/1993 | Parham | 313/580 |
| 5,412,274 | 5/1995 | Parham | 313/580 |
| 5,422,534 | 6/1995 | Dynys | 313/112 |

OTHER PUBLICATIONS

J. H. Selverian and D. O'Neil, Thin Solid Films, 235, 120–128 (1993).
W. D. Kingery, et al, Introduction to Ceramics, John Wiley and Sons, New York, pp. 609–610 (1976).

Primary Examiner—Sandra L. O'Shea
Assistant Examiner—John Ning
Attorney, Agent, or Firm—Carlo S. Bessone

[57] ABSTRACT

A method for making a tantala/silica interference filter on a vitreous substrate, the filter retaining integrity at temperatures in excess of 600° C., includes the steps of applying to the vitreous substrate a first coating of vitreous silica doped with submicron-sized particles, depositing on the first coating by low pressure chemical vapor deposition the filter which comprises a second coating comprising alternating layers of tantala and silica, and heat treating the substrate and first and second coatings to bond the filter to the substrate. There is further provided an electric lamp having an envelope made in accordance with the above method.

6 Claims, 2 Drawing Sheets

```
┌─────────────────────────────────┐
│ APPLY TO A VITREOUS SUBSTRATE   │
│ A FIRST COATING OF VITREOUS     │
│ SILICA DOPED WITH SUBMICRON-    │
│ SIZED SILICA PARTICLES          │
└─────────────────────────────────┘
                │
┌─────────────────────────────────┐
│ DEPOSIT ON SAID FIRST COATING   │
│ BY LOW PRESSURE CHEMICAL VAPOR  │
│ DEPOSITION A SECOND COATING     │
│ COMPRISING ALTERNATING LAYERS   │
│ OF TANTALA AND SILICA           │
└─────────────────────────────────┘
                │
┌─────────────────────────────────┐
│ HEAT TREATING SAID SUBSTRATE    │
│ AND SAID FIRST AND SECOND       │
│ COATINGS                        │
└─────────────────────────────────┘
```

*FIG. 1*

METHOD FOR MAKING A TANTALA/SILICA INTERFERENCE FILTER ON A VITREOUS SUBSTRATE AND AN ELECTRIC LAMP MADE THEREBY

BACKGROUND OF THE INVENTION

1. Field of the invention

This invention relates to light interference filters for lamps, and is directed more particularly to a method for making tantala/silica interference filters and to an electric lamp having such a filter thereon.

2. Description of the Prior Art

Thin film optical coatings, known as interference filters, which comprise alternating layers of two or more materials of different indices of refraction, are well known to those skilled in the art. Such coatings, or films, are used to selectively reflect or transmit light radiation from various portions of the electromagnetic radiation spectrum, such as ultraviolet, visible and infrared radiation. The films or coatings are used in the lamp industry to coat reflectors and lamp envelopes. One-application in which the thin film optical coatings are useful is to improve the illumination efficiency, or efficacy, of incandescent lamps by reflecting infrared energy emitted by a filament, or arc, back to the filament or arc while transmitting the visible light portion of the electromagnetic spectrum emitted by the filament. This lowers the amount of electrical energy required to be supplied to the filament to maintain its operating temperature. In other lamp applications, where it is desired to transmit infrared radiation, such filters reflect the shorter wavelength portions of the spectrum, such as ultraviolet and visible light portions emitted by the filament or arc, and transmit primarily the infrared portion in order to provide heat radiation with little or no visible light radiation. Such an application of this latter type includes a typical radiant heater for use where visible radiation emitted by the heater is unwanted.

Such interference filters useful for applications where the filter will be exposed to high temperature in excess of 500° C., or so, have been made of alternating layers of tantala (tantalum pentoxide $Ta_2O_5$) and silica ($SiO_2$), wherein the silica is the low refractive index material and the tantala is the high refractive index material. Such filters, and lamps employing same, are disclosed in U.S. Pat. Nos. 4,588,923; 4,663,557 and 4,689,519. In such lamp applications, the interference filters, which are applied on the outside surface of the vitreous lamp envelope containing the filament within, often reach operating temperatures in the range of about 800°–900° C. These interference filters, or coatings, have been applied primarily using evaporation or sputtering techniques which, while capable of producing a satisfactory interference filter, have limitations with respect to not being able to apply a uniform coating to any but a flat surface. In the case of tubing used for making lamps, the tubing must be rotated in the sputtering or vacuum evaporation chamber as the coating is being applied. This technique does not lend itself to applying uniform coatings to curved objects. Moreover, this technique is rather costly.

In U.S. Pat. No. 4,949,005, issued Aug. 14, 1990, in the name of Thomas G. Parham, et al, there is described a method for the manufacture of thin film interference filters consisting of alternating layers of tantala and silica suitable for high temperature use on electric lamps. Depending upon the individual layer thickness, such filters may be designed to reflect light with wavelengths falling within a particular range, while transmitting light of other wavelengths. As described in the '005 U.S. Pat. No. , one application of such thin film interference filters is as coatings on the vitreous envelopes of incandescent lamps, which coatings improve lamp efficiency by reflecting infrared energy emitted by the lamp filament back onto the filament, while transmitting visible light emitted by the filament. The method for the manufacture of such multilayer coatings described in U.S. Pat. No. '005 essentially involves depositing alternating layers of tantala and silica upon the surface of the lamp by low pressure chemical vapor deposition. In order to avoid the development of catastrophic stresses when the coated lamps are subsequently burned, leading to poor adhesion and poor optical properties, the coated lamps are heat treated to a temperature at least as high as the temperature of the lamp surface when the lamp is burned. Moreover, during this heat treatment process, the temperature of the coated lamp is maintained between 550° and 675° C. for a period of time ranging between 0.5 hour and 5 hours, before being exposed to the higher lamp burning temperature, to control the rate of formation and growth of tantala crystallites during the heat treatment. The higher temperature is applied for 0.1–5 hours, and is at least as high as the lamp surface when the lamp is burned. During the heat treatment process, a pattern of fine randomly oriented cracks develops, resulting in a decrease in the overall, or average, stress. Random cracking is a natural consequence of high stresses in thin films. The heat treatment conditions allow cracked coatings to remain stable during lamp operation.

However, depending upon the coating-deposition and heat-treatment conditions employed in a particular case, the resulting tantala/silica multilayer coatings may be so highly stressed that they begin to peel from the surfaces of the vitreous incandescent lamp envelopes during the heat-treatment process itself. Because it may be difficult or impossible to predict or control the buildup of such unusually high stresses within the multilayer coatings, methods have been sought by which to assure that the tantala-silica coatings remain completely attached to the surfaces of the vitreous substrates during heat-treatment processing.

There is thus a need for an improved method for making a thin film optical coating interference filter upon a vitreous substrate, such as an electric lamp envelope, which coating comprises alternating layers of tantala and silica, which method results in such a coating as is well adhered to the substrate and remains so at temperatures in excess of 600° C. There is further needed a lamp which is provided with such a coating which remains well adhered thereto under operating conditions.

SUMMARY OF THE INVENTION

It therefore is an object of the invention to provide a method for making a tantala/silica interference filter on a vitreous substrate, the filter retaining adherence integrity at temperatures in excess of 600° C.

A further object of the invention is to provide an electric lamp having a light transmissive vitreous envelope for enclosing an electric light source, and an interference filter on the surface of the lamp envelope and exhibiting adhesion thereto at temperatures in excess of 600° C.

With the above and other objects in view, as will hereinafter appear, a feature of the present invention is the provision of a method for making a tantala/silica interference filter on a vitreous substrate, the filter retaining integrity at temperatures in excess of 600° C., the method including the steps of applying to the vitreous substrate a first coating of vitreous silica doped with submicron-sized particles, depositing on the first coating by low pressure chemical vapor deposition the filter comprising a second coating which, in turn, comprises alternating layers of tantala and silica, and heat treating the substrate and first and second coatings to bond the filter to the substrate.

In accordance with a further feature of the invention, there is provided an electric lamp comprising a light transmissive vitreous envelope for enclosing an electric light source, a first coating of vitreous silica doped with submicron-sized particles disposed on the envelope, and a second coating comprising alternating layers of tantala and silica disposed on the first coating. The envelope and first and second coatings are bonded together by heat treatment, such that the second coating retains integrity at temperatures in excess of 600° C.

The above and other features of the invention, including various novel details of construction and combinations of parts and method steps, will now be more particularly described with reference to the accompanying drawings and pointed out in the claims. It will be understood that the particular method and device embodying the invention are shown by way of illustration only and not as limitations of the invention. The principles and features of the invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent:

In the drawings:

FIG. 1 is a block diagram setting forth an illustrative embodiment of the inventive method;

DESCRIPTION OF THE PREFERRED EMBODIMENT

Referring to FIG. 1, there is illustrated diagrammatically an improved process for making a tantala/silica interference filter upon a vitreous substrate, which filter is useful at temperatures in excess of 600° C. According to the improved process, a vitreous substrate is first coated with a layer of vitreous silica doped with submicron-sized silica particles. A tantalasilica multilayer interference filter is then deposited upon the interfacial silica layer by a suitable low pressure chemical vapor deposition process. Finally, the coated substrate is heat-treated in the manner described in the Parham, '005 patent so as to fully stabilize the coating. In particular, during the heat-treatment process, the temperature of the coated substrate is maintained between about 550° C. and about 675° C. for a period of time ranging between 0.5 hour and 5 hours. If the coating is applied to the vitreous envelope of an electric lamp (e.g., a fused silica lamp envelope), additional heat treatment is applied wherein the maximum heat treatment temperature is at least as high as the maximum temperature of the lamp surface when the lamp is burned. The coated vitreous substrate is maintained at that elevated temperature for 0.1–5 hours. The method for the manufacture of a tantala-silica interference filter disclosed herein is an improvement over that described by Parham, et al, in that the multilayer interference filter applied in accordance with the present invention is much more likely to remain firmly bonded to the vitreous substrate than if an interfacial silica layer doped with submicron-sized silica particles is not deposited upon the vitreous substrate prior to deposition of the tantalasilica multilayer filter.

Figure 2:
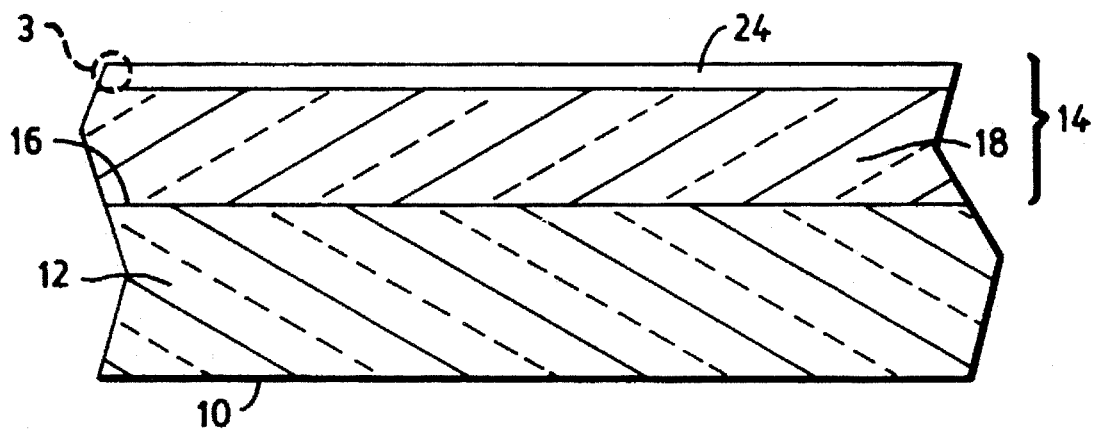
FIG. 2 is a diagrammatic representation of a portion of an electric lamp light transmissive vitreous envelope for enclosing an electric light source, and coatings, including an interference filter on a surface of the envelope.

Referring to FIG. 2, it will be seen that an illustrative embodiment of the invention features an electric lamp 10 comprising a light transmissive vitreous envelope 12 for enclosing an electric light source (not shown), and an interference filter 14 on a surface 16 of the envelope 12.

Figure 3:
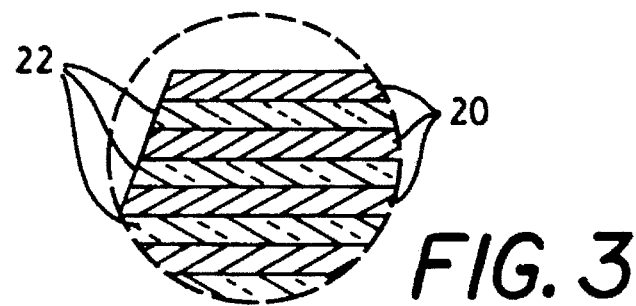
FIG. 3 is a diagrammatic representation of magnified portion of the interference filter of FIG. 2.

The lamp 10 comprises a first coating 18 of vitreous silica doped with submicron-sized silica particles disposed on the surface 16 of the envelope 12, and a second coating 24 of alternating layers of tantala 22 and silica 20 (FIG. 3), the second coating 24 being deposited on the first coating 18 by low pressure chemical vapor deposition.

After application of the first and second coatings 18, 24, the envelope 12 and first and second coatings 18, 24 are subjected to heat treatment for 0.5–5.0 hours at a temperature of between 550° C. and 675° C. Because the substrate comprises the lamp envelope 12, the heat treatment is extended 0.1–5.0 hours, during which time the treatment temperature is at least as high as a maximum temperature of a surface of the lamp when the lamp is burned.

The following examples are provided to illustrate the improved method described above and to clearly indicate the improvement over the prior art.

EXAMPLE 1

The purpose of this example is to illustrate the tendency of multilayer tantala-silica interference filters deposited with high intrinsic stress upon the surfaces of fused silica incandescent lamp envelopes to peel from the lamp envelopes during heat treatment of the coated lamps.

A layer of silica about 500 Angstroms thick was first deposited upon the surfaces of a number of lamps to serve as an optically inactive interfacial layer.

A 37-layer tantala-silica interference filter designed to transmit visible light while reflecting infrared radiation with an approximate 3 micron total thickness was deposited by low pressure chemical vapor deposition upon the layer of silica on the surfaces of the incandescent lamps, all having fused silica envelopes. Tantalum ethoxide and diacetoxydi-t-butoxysilane were used as the chemical precursors for the high and low index coating materials, respectively, with a deposition temperature of about 465° C. The 37 alternating layers of the tantala-silica filter were deposited, one after the other, until the entire filter was constructed.

The coated lamps were then subjected to the following heat-treatment cycle in an atmosphere of nitrogen gas containing approximately one percent oxygen: heated rapidly to 500° C.; then, heated at 1°/min to 650° C. and held for 3 hours; next, heated at 1°/min to 800° C. and held for 1 hour; finally, cooled to room temperature at 2°–3°/min. Photomicrographs of representative portions of the surfaces of coated lamps after being so heat treated showed that much of the coatings had peeled from the surfaces of the lamps.

EXAMPLE 2

This example is offered to illustrate the improved method that is the subject of this invention.

A layer of silica was first deposited upon the surfaces of a number of incandescent lamps to serve as optically inactive interfacial layers. However, in this case, the silica deposition conditions were adjusted so that numerous submicron-sized silica particles (formed in the gas phase via thermal decomposition of the diacetoxydi-t-butoxysilane coating precursor) were incorporated into the interfacial silica layer. The silica particles were formed by approximately doubling the system pressure during the silica deposition process.

A 37-layer tantala-silica interference filter identical to that described in the first example was deposited upon the silica layers on the incandescent lamps using the same low pressure chemical vapor deposition process.

The fully coated lamps were then heat treated exactly as described in the first example. Photomicrographs of representative portions of the surfaces of the coated lamps after being so heat treated showed that while many cracks developed in the multilayer coatings as a result of the heat-treatment process, the coatings remained firmly attached to the surfaces of the fused silica lamp envelopes.

Accordingly, there is provided a method for making a tantala/silica interference filter on a vitreous substrate, which method produces a filter exhibiting improved adherence to the substrate at temperatures in excess of 600° C. There is further provided an electric lamp having a vitreous envelope and an interference filter on the surface of the lamp envelope, the filter exhibiting improved adhesion to the envelope at temperatures in excess of 600° C. and, in particular, at the maximum surface temperature of the lamp when burning.

It is to be understood that the present invention is by no means limited to the particular construction and method steps herein developed and/or shown in the drawings, but also comprises any modifications or equivalents within the scope of the claims. For example, the first coating may be doped with particles other than silica, and particles of silica, or other materials, may be incorporated in one or more of the optically active layers of the second coating instead of, or in addition to, the particles within the interfacial silica layer.

What is claimed is:

1. An electric lamp comprising a light transmissive vitreous envelope for enclosing an electric light source, a first coating of vitreous silica doped with submicron-sized particles disposed on said envelope, and a second coating comprising alternating layers of tantala and silica disposed on said first coating, said envelope and said first and second coatings being bonded together by heat treatment such that said second coating retains integrity at temperatures in excess of 600° C.

2. The lamp in accordance with claim 1 wherein said second coating comprises an interference filter and is about 3 microns thick.

3. The lamp in accordance with claim 1 wherein said second coating comprises an interference filter having 37 of said alternating layers of tantala and silica.

4. The lamp in accordance with claim 2 wherein said first coating is about 500 Angstroms thick.

5. The lamp in accordance with claim 1 wherein said particles are silica particles.

6. The lamp in accordance with claim 2 wherein said particles are silica particles.

* * * * *